United States Patent
Chen (10) Patent No.: US 11,066,025 B2
(45) Date of Patent: Jul. 20, 2021

(54) ELECTRIC VEHICLE DRIVE SYSTEM AND OPERATION METHOD OF THE SAME

(71) Applicant: Jack Chen, Burr Ridge, IL (US)

(72) Inventor: Jack Chen, Burr Ridge, IL (US)

( * ) Notice: Subject to any disclaimer, the term of this patent is extended or adjusted under 35 U.S.C. 154(b) by 278 days.

(21) Appl. No.: 16/367,234

(22) Filed: Mar. 27, 2019

(65) Prior Publication Data
US 2020/0307476 A1  Oct. 1, 2020

(51) Int. Cl.
*B60R 16/023* (2006.01)
*B60W 10/08* (2006.01)
*H04L 29/08* (2006.01)
*H04L 12/40* (2006.01)

(52) U.S. Cl.
CPC ......... *B60R 16/0231* (2013.01); *B60W 10/08* (2013.01); *H04L 67/12* (2013.01); *H04L 2012/40215* (2013.01); *H04L 2012/40273* (2013.01)

(58) Field of Classification Search
CPC .... B60R 16/0231; B60W 10/08; H04L 67/12; H04L 2012/40215; H04L 2012/40273
USPC .......................................................... 701/1
See application file for complete search history.

(56) References Cited

U.S. PATENT DOCUMENTS

| | | | | |
|---|---|---|---|---|
| 2018/0154929 A1* | 6/2018 | Nejo | ...................... | B62D 1/286 |
| 2018/0157256 A1* | 6/2018 | Oniwa | .................. | G05D 1/0061 |
| 2018/0292833 A1* | 10/2018 | You | ...................... | G05D 1/0088 |
| 2019/0009816 A1* | 1/2019 | Moreillon | ............... | B62D 1/286 |
| 2019/0025825 A1* | 1/2019 | Takahama | ......... | B60W 60/0053 |
| 2019/0244038 A1* | 8/2019 | Tsuchiya | ................. | G08G 1/165 |
| 2019/0273767 A1* | 9/2019 | Nelson | ................ | H04L 65/4015 |
| 2020/0290668 A1* | 9/2020 | Moreillon | ............ | B62D 15/025 |
| 2020/0298881 A1* | 9/2020 | Odate | ....................... | G01D 5/24 |
| 2021/0061344 A1* | 3/2021 | Kitazume | .............. | B62D 1/286 |
| 2021/0134154 A1* | 5/2021 | Wang | ............... | G08G 1/096725 |

FOREIGN PATENT DOCUMENTS

| | | | | |
|---|---|---|---|---|
| WO | WO-2018163553 A1 * | 9/2018 | ............ | B60W 40/12 |
| WO | WO-2019026351 A1 * | 2/2019 | ........... | B62D 15/025 |

OTHER PUBLICATIONS

Wentai et al., "Study on De-Noising to the Signal of Torque Sensor in Electric Power Steering System Using Wavelet Transform," 2004, Publisher: IEEE.*
Rakan C. Chabaan, "Torque estimation in Electrical Power Steering Systems," 2009, Publisher: IEEE.*

* cited by examiner

*Primary Examiner* — Tuan C To
(74) *Attorney, Agent, or Firm* — Rabin & Berdo, P.C.

(57) ABSTRACT

An electric vehicle drive system includes a controller area network (CAN) bus, a plurality of sensors, a vehicle functional module, a database device, an artificial intelligence (AI) computer and an intermediate agent device electrically connected to the database device, the vehicle functional module and the AI computer, and used to identify the kind of the vehicle functional module, match out a communication format corresponding to the kind of the vehicle functional module, produce an instruction complying with the communication format by simulating another instruction received from the AI computer, and send the instruction to the vehicle functional module for performing a specific function for a vehicle.

13 Claims, 4 Drawing Sheets

ELECTRIC VEHICLE DRIVE SYSTEM AND OPERATION METHOD OF THE SAME

BACKGROUND

Field of Disclosure

The disclosure relates to an electric vehicle drive system. More particularly, the disclosure relates to an electric vehicle drive system having an intermediate agent capable of facilitating one of different kinds (e.g., brand) of vehicle functional modules to be driven by an artificial Intelligence computer thereof upon the same communication mode.

Description of Related Art

A vehicle driving system for a wheeled vehicle can sense the environment of the wheeled vehicle, and navigate the wheeled vehicle traveling on the road. More specifically, the vehicle driving system harmoniously controls various different functional modules (e.g., electric power steering module, accelerating module, braking module and shifting module) of the wheeled vehicle by an AI control system for safely assisted driving the wheeled vehicle on the road.

In the initial development of the vehicle driving system, for example, when attempting to integrate an electronic control unit (ECU) of the steering control module into the AI control system, the overall communication formats (e.g., protocols, procedures and coding) of the ECU of the steering control module must be changed or modified for linking cooperatively with the AI control system. Therefore, the ECU of the steering control module is able to perform wheel steering in accordance with the command of the AI control system.

However, since the ECU of the steering control module integrated into the AI control system is quite complicated and inconvenient, and each of the different steering control modules has an ECU with one of different communication formats, thus, it not only may cost time, manpower and cost, but also may postpone the timing of productization.

SUMMARY

In one embodiment of the disclosure, an electric vehicle drive system of a vehicle is provided. The vehicle can be switchable to be operable in a manual-control mode and an automatic-control mode. The electric vehicle drive system includes a controller area network (CAN) bus, a plurality of sensors, a vehicle functional module, a database device, an artificial intelligence (AI) computer and an intermediate agent device. The sensors are connected to each other via the CAN bus. The database device stores a variety of communication formats which are different one another. The AI computer is connected to the sensors respectively, and is used to request the vehicle functional module to perform a specific function for driving the vehicle with the senses of the sensors. The intermediate agent device is electrically connected to the database device, the vehicle functional module and the AI computer. The intermediate agent device is used to identify a kind of the vehicle functional module, match out one of the communication formats corresponding to the kind of the vehicle functional module being identified, determine whether a first instruction is received from the artificial intelligence computer for heading the vehicle functional module, produce a second instruction complying with the one of the communication formats by simulating the first instruction, and send the second instruction to the vehicle functional module, such that the vehicle functional module complying with the one of the communication formats is able to read the second instruction for performing a specific function for the vehicle. According to one or more embodiments of the disclosure, in the electric vehicle drive system, the vehicle functional module includes an electric motor, a torque sensor and an electronical control unit (ECU). The electronical control unit (ECU) is electrically connected to the electric motor to perform a specific function for the vehicle. The torque sensor is located at a steering wheel set of the vehicle and the electronical control unit (ECU). When the vehicle is operated in the manual-control mode, the torque sensor sends a torque sensing signal including an assist torque of the steering wheel set to the intermediate agent device, and when the vehicle is operated in the automatic-control mode, the intermediate agent device bypasses the torque sensor to send the second instruction to the electronical control unit (ECU) to request the electric motor to rotate the steering wheel set in a certain angle in accordance with the second instruction received from the intermediate agent device.

According to one or more embodiments of the disclosure, in the electric vehicle drive system, the intermediate agent device includes a mode changer for switching the vehicle to be operable in either a manual-control mode or an automatic-control mode. When the steering wheel is rotated in the automatic-control mode, the torque sensor sends the torque sensing signal to the intermediate agent device, the mode changer switches the AI computer to be operated in the manual-control mode from the automatic-control mode.

According to one or more embodiments of the disclosure, in the electric vehicle drive system, the vehicle functional module is one of an electric power steering module, an accelerating module, a braking module and a shifting module.

According to one or more embodiments of the disclosure, in the electric vehicle drive system, the AI computer comprises an advanced driver assistance system (ADAS).

According to one or more embodiments of the disclosure, in the electric vehicle drive system, the database device is disposed in the vehicle or in a cloud end.

According to one or more embodiments of the disclosure, in the electric vehicle drive system, the database device is a memory unit being inbuilt in the intermediate agent device.

In one embodiment of the disclosure, an intermediate agent device for an electric vehicle drive system of a vehicle is provided. The intermediate agent device includes a housing, a computing circuit board, a database device, a processing unit and a plurality of connecting ports. The computing circuit board is disposed in the housing. The database device is mounted on the computing circuit board, and stores communication formats which are different one another. The processing unit is mounted on the computing circuit board, and electrically connected to the database device. The connecting ports are arranged on the computing circuit board and the housing, and electrically connected the processing unit. The processing unit is electrically connected to a torque sensor and an electronical control unit (ECU) of the electric power steering module through the connecting ports. The processing unit is used to identify a kind of the torque sensor, match out one of the communication formats corresponding to the kind of the torque sensor being identified, determine whether a first instruction is received from the artificial intelligence computer for heading the electronical control unit, produce a second instruction complying with the one of the communication formats by simulating the first instruction, and send the second instruction to the vehicle functional module, such that the electronical control unit complying with the one of the communication formats is able to read the second instruction for requesting an electric motor to rotate a steering wheel set of the vehicle in a certain angle.

According to one or more embodiments of the disclosure, in the intermediate agent device, the connecting ports are pluggably connected to the AI computer and the electric power steering module.

In one embodiment of the disclosure, an operation method of electric vehicle drive system is provided. The operation method includes steps as follows. A kind of a vehicle functional module of a vehicle is identified; one of communication formats corresponding to the kind of the vehicle functional module being identified is matched out in which the communication formats are stored in a database device of the vehicle; a determination is made as to whether a first instruction is received from an AI computer of the vehicle for heading the vehicle functional module; a second instruction complying with the one of the communication formats is produced by simulating the first instruction when it is determined that the first instruction is received from the artificial intelligence computer; and the second instruction is sent to the vehicle functional module, such that the vehicle functional module complying with the one of the communication formats is able to read the second instruction for performing a specific function for the vehicle.

According to one or more embodiments of the disclosure, in the operation method, the step of identifying the kind of the vehicle functional module further includes several steps as follows. An identification signal of a torque sensor at a steering wheel set of the vehicle is detected when electrically connecting to the torque sensor; and a kind of the torque sensor is recognized according to the identification signal of the torque sensor being detected.

According to one or more embodiments of the disclosure, in the operation method, the step of matching out one of communication formats corresponding to the kind of the vehicle functional module being identified, further includes several steps as follows. A determination is made as to whether the kind of the torque sensor is matched with one of the communication formats stored in the database device; and when it is determined that the kind of the torque sensor is matched with one of the communication formats stored in the database device, an instruction producer capable of producing an instruction to comply with the one of the communication formats is set when simulating any instruction from the artificial intelligence computer.

According to one or more embodiments of the disclosure, in the operation method, the step of producing the second instruction complying with the one of the communication formats by simulating the first instruction, further includes several steps as follows. The first instruction is analyzed to obtain a purpose of the first instruction; a determination is made as to whether the purpose of the first instruction is matched with one of control instructions stored in the database device; and when it is determined that the purpose of the first instruction is matched with the one of the control instructions stored in the database device, the instruction producer is instructed to produce the second instruction which has the same purpose to the first instruction and complies with the one of the communication formats.

According to one or more embodiments of the disclosure, the operation method further includes steps as follows. A determination is made as to whether a third instruction is received from the torque sensor for heading the vehicle functional module, and when it is determined that the third instruction is sent from the torque sensor for heading the vehicle functional module, the vehicle is switched to be operable from an automatic-control mode to an manual-control mode.

Thus, through the construction of the embodiments above, each of the functional modules is not needed to be integrated into the AI computer, thus, it not only may save time, manpower and costs, but also reduce the timing of productization.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 1:
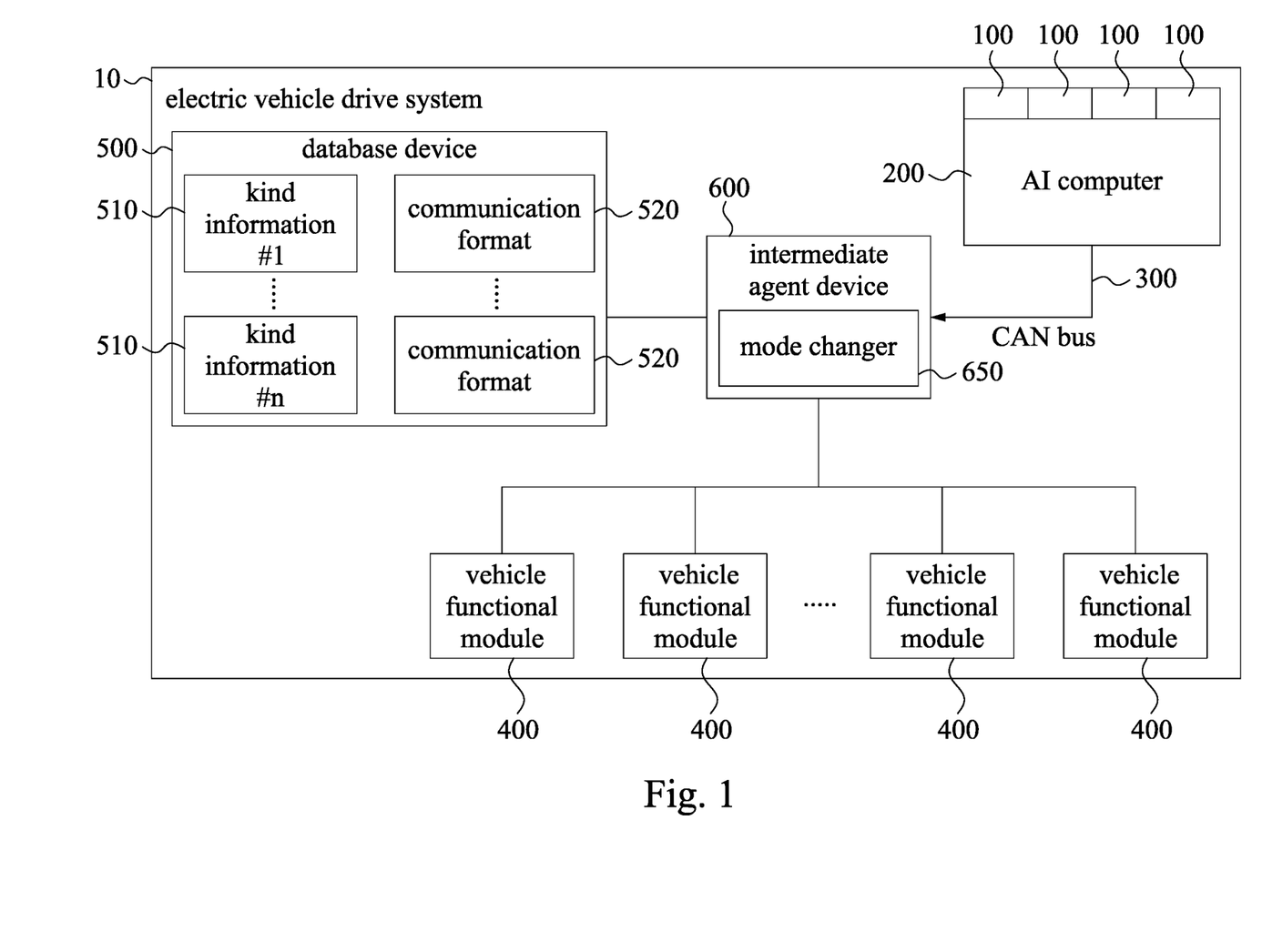
FIG. 1 is a schematic view of an electric vehicle drive system of a vehicle according to one embodiment of the disclosure.

Reference is now made to FIG. 1, in which FIG. 1 is a schematic view of an electric vehicle drive system 10 of a vehicle according to one embodiment of the disclosure. As shown in FIG. 1, the electric vehicle drive system 10 includes a controller area network (CAN hereinafter) bus 300, a plurality of sensors 100, a plurality of vehicle functional modules 400, a database device 500, an artificial intelligence (AI hereinafter) computer 200 and an intermediate agent device 600. These vehicle functional modules 400 are operable in different functions. For example, these vehicle functional modules 400 are an electric power steering (EPS hereinafter) module, an accelerating module, a braking module and a shifting module, respectively. However, the disclosure is not limited to the sorts of the vehicle functional modules 400.

The sensors 100 are different sorts, and the sensors 100 are connected to each other via the CAN bus 300. For example, the sensors 100 are vision sensors (e.g., camera) or non-vision sensors (e.g., Lidar, radar and ultrasonic etc.). However, the disclosure is not limited to the sorts of the sensors.

The database device 500 is loaded in the vehicle, and the database device 500 at least stores a plurality of kind information 510 of those vehicle functional modules 400 and a variety of communication formats 520 (e.g., communication protocols, procedures, coding or instruction language types) which are different one another. Each kind information 510 of the respective vehicle functional modules 400 respectively corresponds to one of the communication formats 520, that is, each of the vehicle functional modules 400 can be provided in many types (e.g., brand, standard or version) in the current market, and each of the kinds of the respective vehicle functional module 400 may comply with a specific communication format for transmitting and receiving instructions to perform the specific function for the vehicle.

The AI computer 200 is connected to the sensors 100 respectively. The AI computer 200 is used to request each of the vehicle functional modules 400 to respectively perform the specific function for driving the vehicle with the senses of the sensors 100. The intermediate agent device 600 is electrically connected to the database device 500, the vehicle functional module 400 and the AI computer 200. The intermediate agent device 600 is used to identify the kind of the vehicle functional module 400, to match out one of the communication formats 520 corresponding to the kind of the vehicle functional module 400, to determine whether, to produce a second instruction complying with the communication formats 520 by simulating a first instruction after the first instruction is received from the AI computer 200 for heading the vehicle functional module, and to send the second instruction to the vehicle functional module 400, such that the vehicle functional module 400 complying with the communication format is able to read the second instruction for performing a specific function for the vehicle.

Thus, through the construction of the embodiments above, because instructions with unfamiliar communication format from the AI computer 200 can be correctly translated and sent to each of the functional modules through the intermediate agent device 600, each of the functional modules is not needed to be integrated into the AI computer 200, that is, each of the functional modules is not needed to be reprogramed in concert with the communication format used by the AI computer 200, thus, it not only may save time, manpower and costs, but also reduce the timing of productization.

Figure 2:
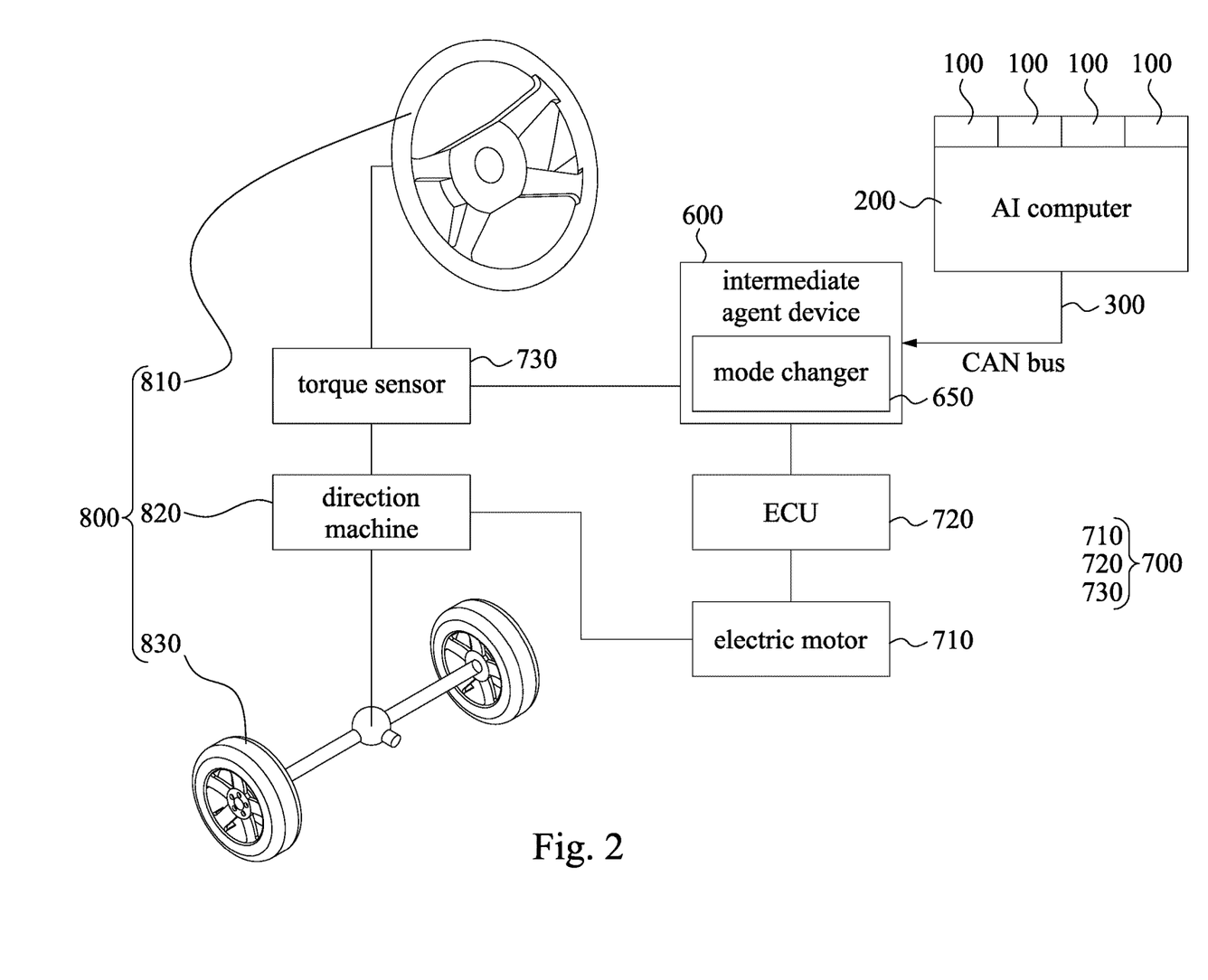
FIG. 2 is a schematic view of an electric vehicle drive system of a vehicle according to one embodiment of the disclosure.

FIG. 2 is a schematic view of an electric vehicle drive system 10 of a vehicle according to one embodiment of the disclosure. For example, one of these vehicle functional modules 400 is an electric power steering (EPS) module 700. Refer to FIG. 2, the EPS module 700 includes an electric motor 710, an electronical control unit (ECU hereinafter) 720 and a torque sensor 730. The torque sensor 730 is located at a steering wheel set 800 of the vehicle, and electrically connected to the intermediate agent device 600. If a driver rotates the steering wheel 810, the torque sensor 730 can determine an assist torque of the steering wheel 810 being requested to rotate by the driver, and send the assist torque to the ECU 720. The electric motor 710 is located under a steering wheel 810 of the steering wheel set 800, and connected to a direction machine 820 of two tires 830 of the steering wheel set 800. The ECU 720 is electrically connected to the electric motor 710 and the intermediate agent device 600, and electrically connected to the torque sensor 730 through the intermediate agent device 600, for conducting the electric motor 710 to rotate the direction machine 820 of the steering wheel 810 according to the assist torque.

As such, when the AI computer 200 requests to rotate the steering wheel set 800, the AI computer 200 sends a first instruction (e.g., rotation with angular rotation degrees) complying with a first communication format to the intermediate agent device 600. The intermediate agent device 600 produces a second instruction by simulating the first instruction, and sends it to the ECU 720 in which the second instruction conforms to a second communication format which is different to the first communication format. Thus, the second instruction is readable by the ECU 720 to request the electric motor 710 to rotate the direction machine 820 of the steering wheel 810 in a certain angle for changing driving direction.

On the other hand, when a driver on the vehicle rotates the steering wheel 810 slightly, the torque sensor 730 determines an assist torque of the steering wheel 810 being requested to rotate by the driver, and sends a third instruction (i.e., torque sensing signal) including the assist torque data to the intermediate agent device 600. The intermediate agent device 600 transmits the third instruction to the ECU 720, and requests the electric motor 710 to rotate the steering wheel 810 of the vehicle in a certain angle in accordance with to the third instruction received from the intermediate agent device 600.

It is noted, the ECU 720 is not directly connected to the torque sensor 730 through wires, and the torque sensor 730 is not directly connected to the AI computer 200 through wires, that is, the AI computer 200 is connected to the ECU 720 through the intermediate agent device 600, and the torque sensor 730 is connected to the ECU 720 through the intermediate agent device 600.

Furthermore, as shown in FIG. 1, the intermediate agent device 600 also includes a mode changer 650 for switching the vehicle to be operable in either a manual-control mode or an automatic-control mode. Thus, when the AI computer 200 is instructed to be operable in the automatic-control mode, the vehicle can be driven on the road by the AI computer 200. On the other hand, when the steering wheel 810 is rotated by a driver in the manual-control mode, the vehicle can be driven on the road by the driver.

It is noted, when the steering wheel 810 is rotated by a driver in the automatic-control mode, the torque sensor 730 sends the torque sensing signal to the intermediate agent device 600, accordingly, the mode changer 650 switches the AI computer 200 to be operated in the manual-control mode from the automatic-control mode according to the third instruction sent from the torque sensor 730. Thus, the driver can take over the vehicle again from this moment.

In big details, the CAN bus 300 is a great vehicle bus standard designed to allow microcontrollers and devices to communicate with each other in applications without a host computer. It is a message-based protocol, designed originally for multiplex electrical wiring within automobiles to save on copper, but is also used in many other contexts.

For example, the AI computer 200 includes an advanced driver assistance system (ADAS) therein. The ADAS includes adaptive headlight aiming, adaptive cruise control, and adaptive shift control. Adaptive headlight aiming adjusts the vehicle's headlights, i.e., width, rotational angle, elevation angle, and brightness, based on the curvature of the road ahead of the vehicle, tilt, elevation change, and other factors. Adaptive cruise control maintains and/or resumes a set speed or safe following distance from other vehicles at slower than the set speed based on data about vehicle speed, nearby vehicles and other obstructions, type of road traveled (motorway vs. local road), road curvature, tilt, elevation, and other factors. Adaptive shift control adjusts the gearing and shifting of automatic transmissions based on sensor data about vehicle speed, engine speed, road curvature, tilt, elevation, and other factors.

For example, the database device 500 above can be a Read Only Memory (ROM), a Flash Memory, a floppy disk, a hardware disk, an optical disc, a flash drive, a magnetic tape, a data library accessible in a cloud end from any networks. It also may be any other non-transitory computer-readable storage medium with the same or equivalent function in this field.

Figure 3:
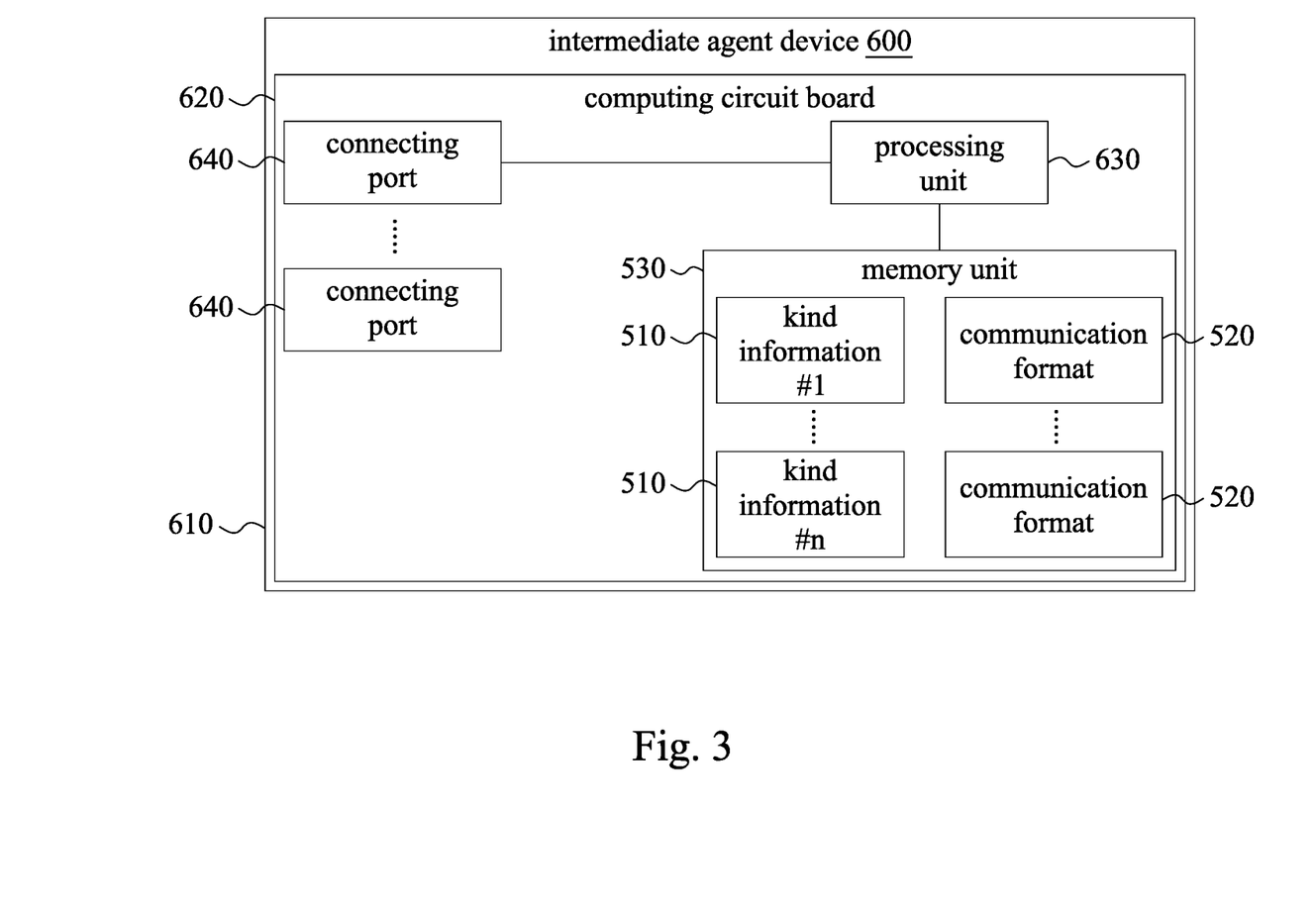
FIG. 3 is a schematic view of an intermediate agent device according to one embodiment of the disclosure.

FIG. 3 is a schematic view of an intermediate agent device 600 according to one embodiment of the disclosure. As shown in FIG. 2 and FIG. 3, the intermediate agent device 600 includes a housing 610, a computing circuit board, a processing unit 630 and a plurality of connecting ports 640. The computing circuit board 620 is disposed in the housing 610. In this embodiment, the database device 500 is in the intermediate agent device 600, rather than out of the intermediate agent device 600 in the vehicle. For example, the database device 500 is a memory unit 530 which is inbuilt in the intermediate agent device 600, and the database device 500 is further mounted on the computing circuit board, and stores communication formats 520 which are different one another. The connecting ports 640 are arranged on the computing circuit board, and electrically connected the processing unit 630. The connecting ports 640 are arranged on the housing 610 to be exposed outwards from several sides of the housing 610. The processing unit 630 is mounted on the computing circuit board, electrically connected to the database device 500, and electrically connected to the torque sensor 730 and an electronical control unit (ECU) 720 of the electric power steering module through the connecting ports 640.

For example, when the intermediate agent device 600 is pluggably connected to the electric power steering module and the AI computer 200, the processing unit 630 identifies the kind of the torque sensor 730 via wires in the vehicle, matches out one of the communication formats 520 corresponding to the kind of the torque sensor 730, determines whether a first instruction is received from the AI computer 200 for heading the ECU 720, produces the second instruction complying with the communication format by simulating the first instruction when a determination is made that the first instruction is received from the AI computer 200, and sends the second instruction to the ECU 720. Thus, the ECU 720 can follow the second instruction to request an electric motor 710 to rotate a steering wheel set 800 of the vehicle in a certain angle. For example but not limited thereto, the processing unit 630 is a chip as a hardware.

In the embodiment, the intermediate agent device 600 can be an independent box which is independently removable from the AI computer 200 and at least one of the vehicle functional modules 400. For example, the connecting ports 640 are pluggably connected to the torque sensor 730, the ECU 720 and the AI computer 200.

Figure 4:
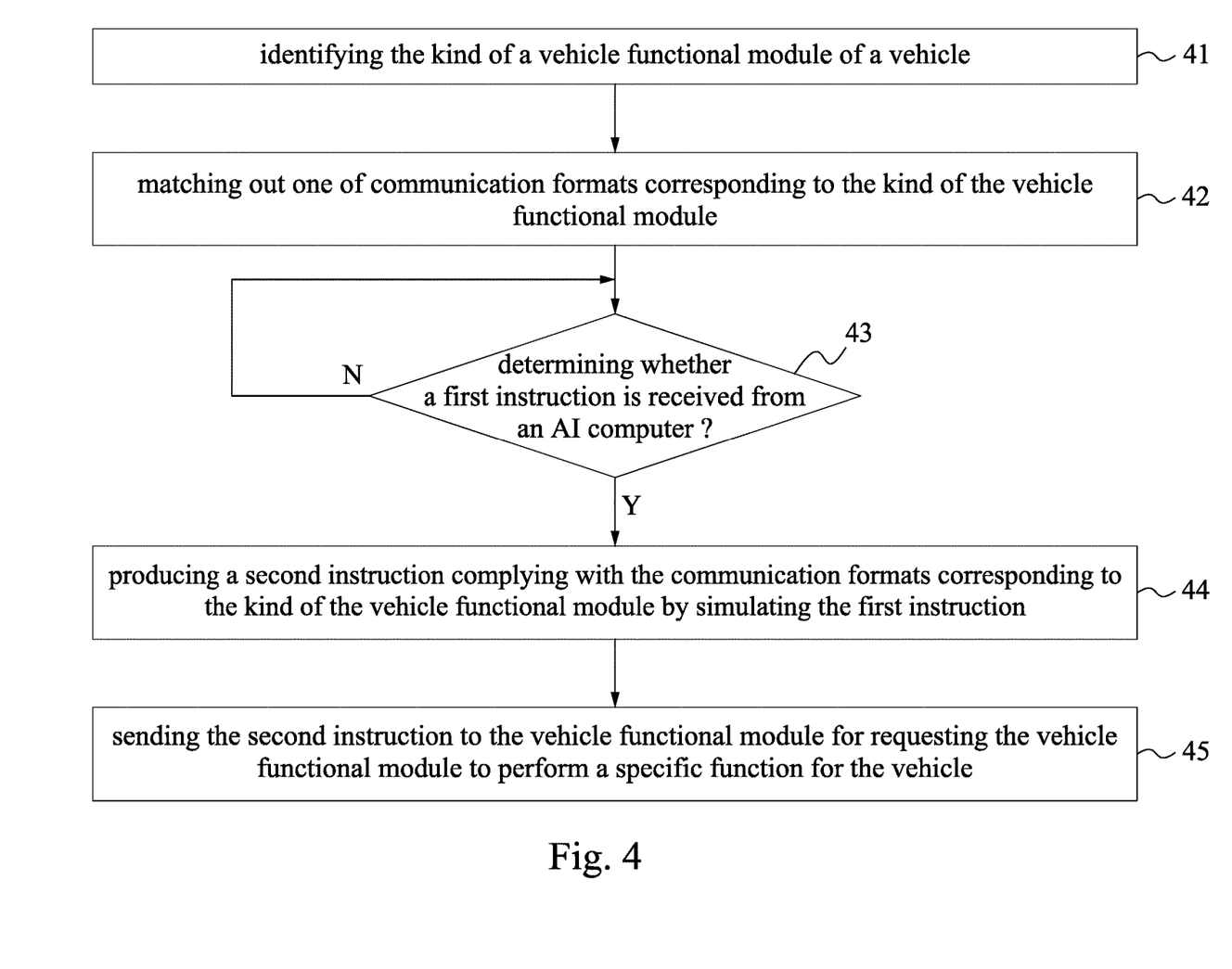
FIG. 4 is a flow cart of an operation method of an electric vehicle drive system.

FIG. 4 is a flow cart of an operation method of an electric vehicle drive system 10. As shown in FIG. 4, the intermediate agent device 600 processes the operation method including step 41 to step 45 as follows. In step 41, a kind of a vehicle functional module 400 of a vehicle is identified. In step 42, one of the communication formats 520 corresponding to the kind of the vehicle functional module 400 identified is matched out. In step 43, a determination is made as to whether a first instruction is received from an AI computer 200, if yes, goes to step 44, otherwise, returns to the step 43. In step 44, a second instruction complying with the communication format (called complied communication format hereinafter) is produced by simulating the first instruction. In step 45, the second instruction is sent to the vehicle functional module 400 for requesting the vehicle functional module 400 to perform a specific function for the vehicle according to the second instruction.

In the step 41, more particularly, whenever the torque sensor 730 is electrically connected by the intermediate agent device 600 of the electric vehicle drive system 10, one identification signal of the torque sensor 730 can be detected. Next, the kind of the torque sensor 730 can be recognized according to the signal of the torque sensor 730, that is, the identification signal of the torque sensor 730 can be compared with the registered signals recorded in a comparison table (not shown) of the database device 500, and a determination is made as to whether the identification signal of the torque sensor 730 is matched with anyone of the registered signals recorded in the comparison table (not shown). For one example, there are a number of torque sensors with different brands are provided in the current markets, and the torque sensors with different brands may respectively have a distinctive identification signal format. The kind information 510 storing in the database device 500 respectively represent different identification signal formats of torque sensors, accordingly, the kind of the specific torque sensor 730 in the electric power steering (EPS) module can be found out.

In the step 42, more particularly, one of the communication formats 520 stored in the database device 500 is corresponded with the kind of the torque sensor 730 according to the comparison table (not shown) in the database device 500, so that a determination is made as to whether the kind of the torque sensor is matched with one of the communication formats 520 stored in the database device 500. Next, when it is determined that the kind of the torque sensor 730 is matched with one of the communication formats 520 stored in the database device 500, an instruction producer capable of producing an instruction (e.g. second instruction) to comply with the complied communication format is set when simulating any instruction from the AI computer 200. It is noted, the instruction producer can be implemented as hardware, software or firmware.

In the step 44, more particularly, after receiving a first instruction from the AI computer 200 via the CAN bus 300, the first instruction is analyzed to obtain a purpose of the first instruction. For example, by analyzing the packages of the signals of the first instruction received by the intermediate agent device 600, the corresponding one of the registered control instructions recorded in the comparison table (not shown) can be matched out.

Next, the purpose of the first instruction is compared with registered control instructions recorded in the comparison table (not shown) of the database device, and a determination is made as to whether the purpose of the first instruction is matched with one of the registered control instructions in the comparison table (not shown) of the database device 500. When it is determined that the purpose of the first instruction is matched with the control instruction in the database device 500, the instruction producer is instructed to produce the second instruction which has the same purpose to the first instruction and complies with the one of the communication formats.

It is noted, for example, all instructions of the AI computer 200 to the vehicle functional modules 400 can be registered in the database device 500 in advance, and the purpose of each of the first instructions sent from the AI computer 200 can be recorded in the packages in the signals of the first instruction, thus, the purpose of each of the first instructions can be analyzed by extracting from the packages in the signals of the first instruction.

For example, the first instruction can be identified as a request of being rotated about 120°, next, an instruction to rotate the steering wheel set 800 about 120° will be produced complying with the complied communication format by the aforementioned instruction producer.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electric vehicle drive system of a vehicle switchably operable in a manual-control mode and an automatic-control mode, comprising:
   a controller area network (CAN) bus;
   a plurality of sensors connected to each other via the controller area network bus;
   an electric power steering module;
   a database device storing a variety of communication formats which are different one another;
   an artificial intelligence (AI) computer respectively connected to the sensors, and configured to request the electric power steering module to perform a specific function for driving the vehicle with the senses of the sensors; and
   an intermediate agent device arranged between the artificial intelligence computer and the electric power steering module, electrically connected to the database device, the electric power steering module and the artificial intelligence computer, the intermediate agent device comprising a torque sensor located at a steering wheel set of the vehicle, electrically connected the intermediate agent device, the intermediate agent device being configured to:
   identify a kind of the torque sensor of the electric power steering module,
   match out one of the communication formats corresponding to the kind of the electric power steering module being identified,
   determine whether a first instruction is received from the artificial intelligence computer for heading the electric power steering module,
   produce a second instruction complying with the one of the communication formats by simulating the first instruction, and
   send the second instruction to the electric power steering module, such that the electric power steering module complying with the one of the communication formats is able to read the second instruction for performing a specific function for the vehicle.

2. The electric vehicle drive system of the vehicle of claim 1, wherein the electric power steering module comprises:
   an electric motor; and
   an electronical control unit (ECU) electrically connected to the torque sensor and the electric motor to perform a specific function for the vehicle,
   wherein, when the vehicle is in the manual-control mode, the torque sensor sends a torque sensing signal including an assist torque of the steering wheel set to the intermediate agent device, and when the vehicle is in the automatic-control mode, the intermediate agent device bypasses the torque sensor to send the second instruction to the electronical control unit (ECU) to request the electric motor to rotate the steering wheel set in a certain angle in accordance with the second instruction received from the intermediate agent device.

3. The electric vehicle drive system of the vehicle of claim 2, wherein the intermediate agent device comprises a mode changer for switching the vehicle to be operable in either the manual-control mode or the automatic-control mode,
   wherein, when the steering wheel is rotated in the automatic-control mode, the torque sensor sends the torque sensing signal to the intermediate agent device, the mode changer switches the artificial intelligence computer to be operated in the manual-control mode from the automatic-control mode.

4. The electric vehicle drive system of the vehicle of claim 1, wherein the artificial intelligence computer comprises an advanced driver assistance system (ADAS).

5. The electric vehicle drive system of the vehicle of claim 1, wherein the database device is disposed in the vehicle or in a cloud end.

6. The electric vehicle drive system of the vehicle of claim 1, wherein the database device is a memory unit being inbuilt in the intermediate agent device.

7. An intermediate agent device for an electric vehicle drive system of a vehicle, the electric vehicle drive system comprising an artificial intelligence computer and an electric power steering module, and the intermediate agent device being arranged between the artificial intelligence computer and the electric power steering module, the intermediate agent device comprising:
   a housing;
   a computing circuit board disposed in the housing;
   a database device mounted on the computing circuit board, and storing communication formats which are different one another;
   a processing unit mounted on the computing circuit board, and electrically connected to the database device; and
   a plurality of connecting ports which are arranged on the computing circuit board and the housing, and electrically connected the processing unit, wherein the processing unit is electrically connected to a torque sensor and an electronical control unit (ECU) of the electric power steering module through the connecting ports, and the processing unit is configured to:
   identify a kind of the torque sensor,
   match out one of the communication formats corresponding to the kind of the torque sensor being identified,
   determine whether a first instruction is received from the artificial intelligence computer for heading the electronical control unit,
   produce a second instruction complying with the one of the communication formats by simulating the first instruction, and
   send the second instruction to the vehicle functional module, such that the electronical control unit complying with the one of the communication formats is able to read the second instruction for requesting an electric motor to rotate a steering wheel set of the vehicle in a certain angle.

8. The intermediate agent device of claim 7, wherein the connecting ports are pluggably connected to the artificial intelligence computer and the electric power steering module.

9. An operation method of an electric vehicle drive system, comprising:
- identifying a kind of a torque sensor of an electric power steering module of a vehicle;
- matching out one of communication formats corresponding to the kind of the torque sensor being identified, wherein the communication formats are stored in a database device of the vehicle;
- determining whether a first instruction is received from an artificial intelligence computer of the vehicle for heading the electric power steering module;
- producing a second instruction complying with the one of the communication formats by simulating the first instruction when it is determined that the first instruction is received from the artificial intelligence computer; and
- sending the second instruction to the electric power steering module, such that the electric power steering module complying with the one of the communication formats is able to read the second instruction for performing a specific function for the vehicle.

10. The operation method of the electric vehicle drive system of claim 9, wherein the step of identifying the kind of the torque sensor further comprises:
- detecting an identification signal of the torque sensor at a steering wheel set of the vehicle when electrically connecting to the torque sensor; and
- recognizing a kind of the torque sensor according to the identification signal of the torque sensor being detected.

11. The operation method of the electric vehicle drive system of claim 10, wherein the step of matching out one of communication formats corresponding to the kind of the electric power steering module being identified further comprises:
- determining whether the kind of the torque sensor is matched with one of the communication formats stored in the database device; and
- when it is determined that the kind of the torque sensor is matched with one of the communication formats stored in the database device, setting an instruction producer capable of producing an instruction to comply with the one of the communication formats when simulating any instruction from the artificial intelligence computer.

12. The operation method of the electric vehicle drive system of claim 11 wherein the step of producing the second instruction complying with the one of the communication formats by simulating the first instruction further comprises:
- analyzing the first instruction to obtain a purpose of the first instruction;
- determining whether the purpose of the first instruction is matched with one of control instructions stored in the database device; and
- when it is determined that the purpose of the first instruction is matched with the one of the control instructions stored in the database device, instructing the instruction producer to produce the second instruction which has the same purpose to the first instruction and complies with the one of the communication formats.

13. The operation method of the electric vehicle drive system of claim 10, further comprising:
- determining whether a third instruction is received from the torque sensor for heading the electric power steering module; and
- when it is determined that the third instruction is sent from the torque sensor for heading the electric power steering module, switching the vehicle to be operable from an automatic-control mode to an manual-control mode.

* * * * *